United States Patent [19]
Shimizume

[11] Patent Number: 5,471,442
[45] Date of Patent: Nov. 28, 1995

[54] COMPACT DISC PLAYER USING SUB-Q DATA FOR TRACK JUMP COMPENSATION

[75] Inventor: Kazutoshi Shimizume, Kanagawa, Japan

[73] Assignee: Sony Corporation, Tokyo, Japan

[21] Appl. No.: 174,761

[22] Filed: Dec. 29, 1993

Related U.S. Application Data

[63] Continuation of Ser. No. 837,894, Feb. 20, 1992, abandoned.

[30] Foreign Application Priority Data

Feb. 22, 1991 [JP] Japan .................................... 3-050468

[51] Int. Cl.⁶ .............................. G11B 21/08; G11B 7/00; G11B 20/18
[52] U.S. Cl. ..................... 369/32; 369/44.32; 360/78.14
[58] Field of Search .............................. 369/267, 32, 33, 369/43, 44.32, 44.33; 360/77.01, 77.02, 78.01, 78.04, 78.14

[56] References Cited

U.S. PATENT DOCUMENTS

| | | | |
|---|---|---|---|
| 4,541,093 | 8/1985 | Furuya et al. | 369/49 |
| 4,598,403 | 7/1986 | Odaka | 371/39 |
| 4,603,412 | 7/1986 | Yamazaki | 369/43 |
| 4,742,507 | 5/1988 | Kuroki et al. | 369/54 |
| 4,807,206 | 2/1989 | Moriya et al. | 369/32 |
| 4,860,272 | 8/1989 | Nishikawa et al. | 369/44 |
| 5,148,417 | 9/1992 | Wong et al. | 369/44.32 |

FOREIGN PATENT DOCUMENTS

| | | |
|---|---|---|
| 62-52767 | 3/1987 | Japan . |
| 62-150560 | 7/1987 | Japan . |
| 62-183065 | 8/1987 | Japan . |
| 62-192079 | 8/1987 | Japan . |

*Primary Examiner*—Stuart S. Levy
*Assistant Examiner*—Paul J. Ditmyer
*Attorney, Agent, or Firm*—William S. Frommer; Alvin Sinderbrand

[57] ABSTRACT

A CD player is disclosed in which it is adapted such that a data signal of a greater amount than necessary is reproduced by rotating a compact disk at a speed higher than its normal rotating speed and the data signal is stored into a large-capacity memory before the signal is deinterleaved and the data stored in the large-capacity memory is read and output even while a pickup, when a track jump has occurred, is being returned to the position preceding where the track jump occurred, whereby the continuity of the output signal from the CD player is maintained.

6 Claims, 3 Drawing Sheets

COMPACT DISC PLAYER USING SUB-Q DATA FOR TRACK JUMP COMPENSATION

This application is a continuation of application Ser. No. 07/837,894, filed Feb. 20, 1992, now abandoned.

BACKGROUND OF THE INVENTION

1. Field of the Invention

The present invention relates to a CD player and, more particularly, to a CD player apparatus suitable for a CD player for outdoor use of which an improved shockproof property is required.

2. Description of the Related Art

CD players of the type in which a laser spot is thrown on pits formed on a compact disk and the reflected beam therefrom is detected and information recorded on the compact disk is thereby reproduced are in practical use now.

The CD player of such type is provided, between the disk and the optical pickup, with a focus servo for forming the image of the laser spot right on the signal recording surface of the disk at all times, a tracking servo causing the laser spot to correctly track the pit train, a motor servo for rotating the disk at the right speed of rotation corresponding to the position of the pickup, a feed servo for allowing the optical pickup to access a desired position, etc. Thus, the disk and the pickup are controlled strictly to keep predetermined relative position at all times.

Accordingly, the CD player in practical use today can perform its playback operation well even under a certain amount of external force. It can be especially strengthened against rolling. However, when the external force exceeds certain limit, it sometimes cause the disk and the optical pickup to deviate from the predetermined relative position, i.e., to cause what is called a track jump.

When such track jump occurs, the reproduced RF signal breaks its continuity and, hence, there has been a problem that a dropout is produced while for example music is being played back. Thus, there is a limit to the improvement of the shockproof property of the CD player achievable only by the reinforcement, as hitherto carried out, of servo mechanisms, and it has been impossible to greatly improve the shockproof property of CD players for outdoor use such as on-vehicle CD players and portable CD players. Hence, it has been unachievable to fabricate a portable CD player with such an excellent shockproof property that a jogger for example can use it while jogging.

SUMMARY OF THE INVENTION

Accordingly, an object of the present invention is to provide a CD player in which the continuity of the reproduced signal is prevented from being broken when a track jump occurs.

In order to achieve the above mentioned object, the CD player according to the present invention comprises a motor servo circuit for rotating a compact disk at a speed higher than its normal rotating speed, a pickup for reproducing a data signal through detection of pits formed on the compact disk, a large-capacity memory for recording the data signal output from the pickup before the signal is deinterleaved, track jump detection means for monitoring continuity of a Sub-Q signal in a data signal output from the pickup to thereby detect a track jump made by the pickup and outputting a track jump detection signal indicative of the magnitude, direction, etc. of the track jump, and tracking servo means for controlling a tracking servo circuit in accordance with the track jump detection signal output from the track jump detection means to thereby return the position of the pickup to the tracking position preceding where the track jump occurred.

The compact disk is rotated at a speed higher than its normal rotating speed to thereby reproduce a greater amount of the data signal than necessary and the signal is stored in the large-capacity memory before it is deinterleaved, and thus a predetermined amount of the data signal is stored in the memory at all times. Continuity of the Sub-Q data in the data signal is monitored to have a track jump detected, and if a track jump occurs, the tracking position of the pickup is returned to the position preceding where the track jump occurred and the reproduction of the RF signal is resumed from that position. While the reproduction of the RF signal is suspended, it is adapted such that the data stored in the large-capacity memory is read out so that the continuity of the reproduced output is kept unbroken.

DESCRIPTION OF THE PREFERRED EMBODIMENTS

Figure 1:
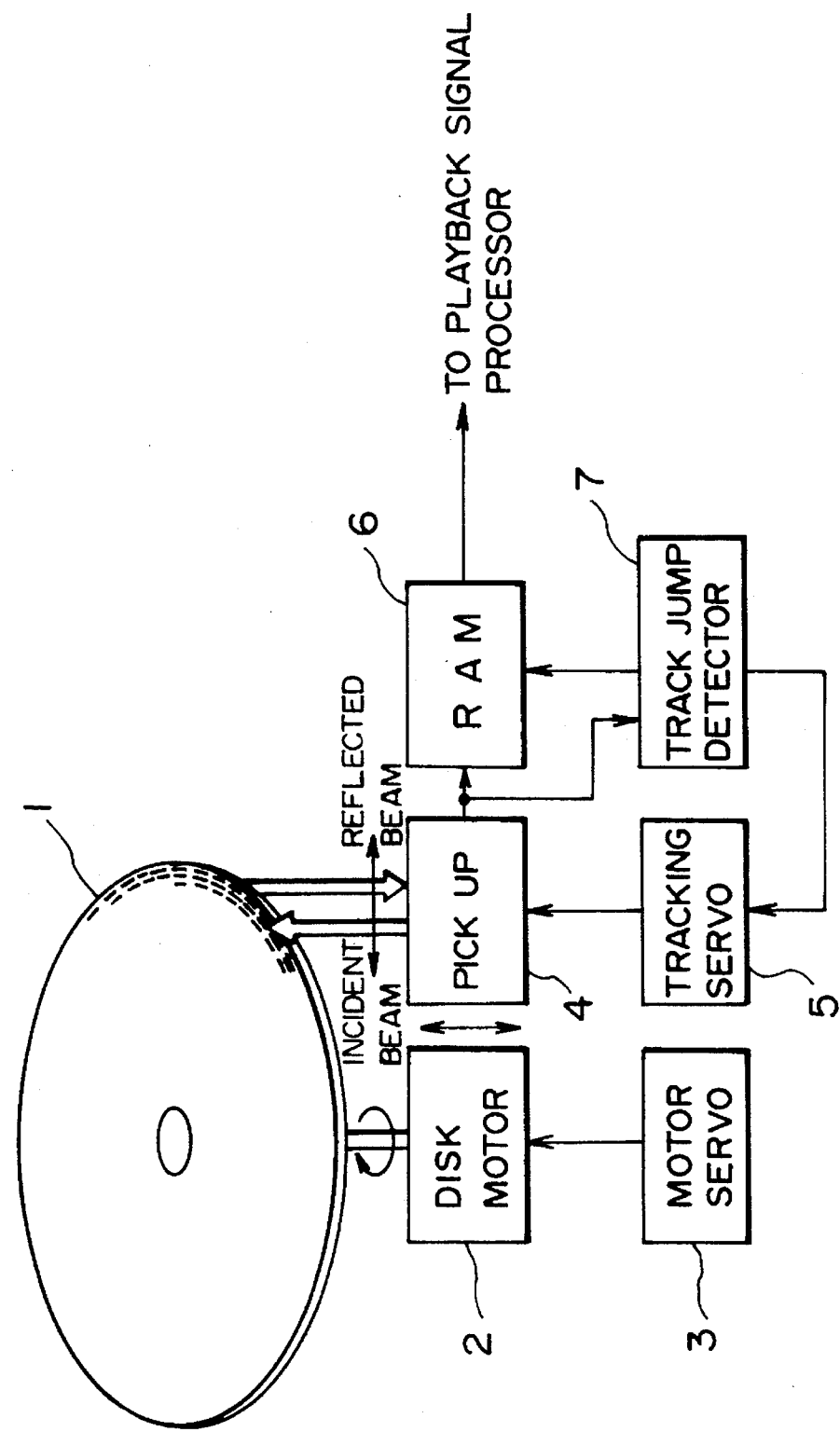
FIG. 1 is a block diagram showing a CD player according to an embodiment of the present invention.

FIG. 1 is a functional block diagram showing an embodiment of a CD player of the present invention.

As apparent from FIG. 1, the CD player of the present embodiment comprises a disk 1, a disk motor 2, a motor servo circuit 3, a pickup 4, a tracking servo circuit 5, a large-capacity memory 6, a track jump detection means 7, etc.

The motor servo circuit 3 causes the compact disk 1 to rotate at a higher speed than the normal rotating speed so that the reproduction of an RF signal by the pickup 4 is performed at a higher speed than that in an ordinary CD player.

A greater amount of data signal output from the pickup 4, before being deinterleaved, is written into the large-capacity memory 6. The write operation is performed under the control of the track jump detection means 7 which checks, during the course of the write operation, the continuity of the Sub-Q data.

The principle of the CD player of the present invention is that information of a larger quantity than necessary is reproduced by rotating the disk 1 at a higher speed than the normal rotating speed as described above and the information is recorded in the large-capacity memory for deinterleaving 6. When the track jump detection means 7 detects a track jump, the address of the position preceding where the track jump was produced is searched for. Then, the pickup 4 is returned to the tracking position preceding where the track jump occurred and reproduction is restarted from that position. By so doing, the portion not reproduced due to a track jump is prevented from being produced and the continuity of the reproduced power is thereby maintained.

On the other hand, since the RF signal cannot be reproduced from the disk 1 while the address of the position preceding where the track jump occurred is being searched for, it becomes impossible to write data into the RAM for deinterleaving 6, and, meanwhile, only the read operation is performed. Consequently, the data recorded in the large-capacity memory 6 gradually decreases and it occurs that no reproduced signal can be output any more from the CD player when the memory is emptied of the recorded data.

To prevent such inconvenience from occurring, the memory 6 is made larger in capacity so that the memory is not emptied of the data during the period from the detection of the track jump to the resumption of the reproduction of the RF signal upon locating the address preceding the track jump.

In this case, since the disk is caused to rotate at a higher speed than its normal rotating speed, the RAM becomes full of data when no track jump occurs. Therefore the data comes to overflow unless a certain measure is taken. In order to prevent such inconvenience from occurring, the CD player of the present embodiment is adapted such that a reverse jump of one track is repeated to maintain its pause state when the large-capacity memory 6 has become full.

It is also adapted in the embodiment such that the absolute time of the Sub-Q data is used as the address for determining occurrence of a track jump, etc. More specifically, the Sub-Q data are written into the RAM in units of 98 frames as the unit of the Sub-Q data, and the data, when it is correct in terms of the unit, is normally written, but, when it is incorrect, it is not written in the 98-frame unit. At this time, if the processing is performed before the data is deinterleaved (as data strings), the $C_1$ correction and $C_2$ correction can be carried out on the data gone through the linking processing. Thereby, a merit can be obtained that the reliability on the data is enhanced because the linking error is also detected at the time of error detection.

A point in the practice of the data linking on the basis of the Sub-Q data is this. That is, in the error correction code called CIRC adopted in the CD system, ±4 frames of the frame jitter margin (in the case of 16K) or ±28 frames of the frame jitter margin (in the case of 32K) are provided in order to improve the resistance against external disturbance of the spindle motor. Accordingly, in the case of ±4 frames, delays of 4 frames are provided before and after the RF signal is written.

In the CD format currently in use, there is no other way than using the Sub-Q data for achieving the data linking as described above. The Sub-Q data is obtained at the data rate of one bit/frame after the EFM modulation. In other words, it is possible to determine the Sub-Q data at its frame partition (such as $S_0$ or $S_1$) on the writing side but it is difficult to determine that on the reading side, because there is the rotation jitter of the spindle motor between the writing side and the reading side. Further, since the discontinuous portion (on the RF side) is dispersed in 108 frames (in the case of ±4 frames) after the deinterleaving, it is better to perform the linking process in units of the Sub-Q frame on the writing side of the RF signal.

Figure 2:
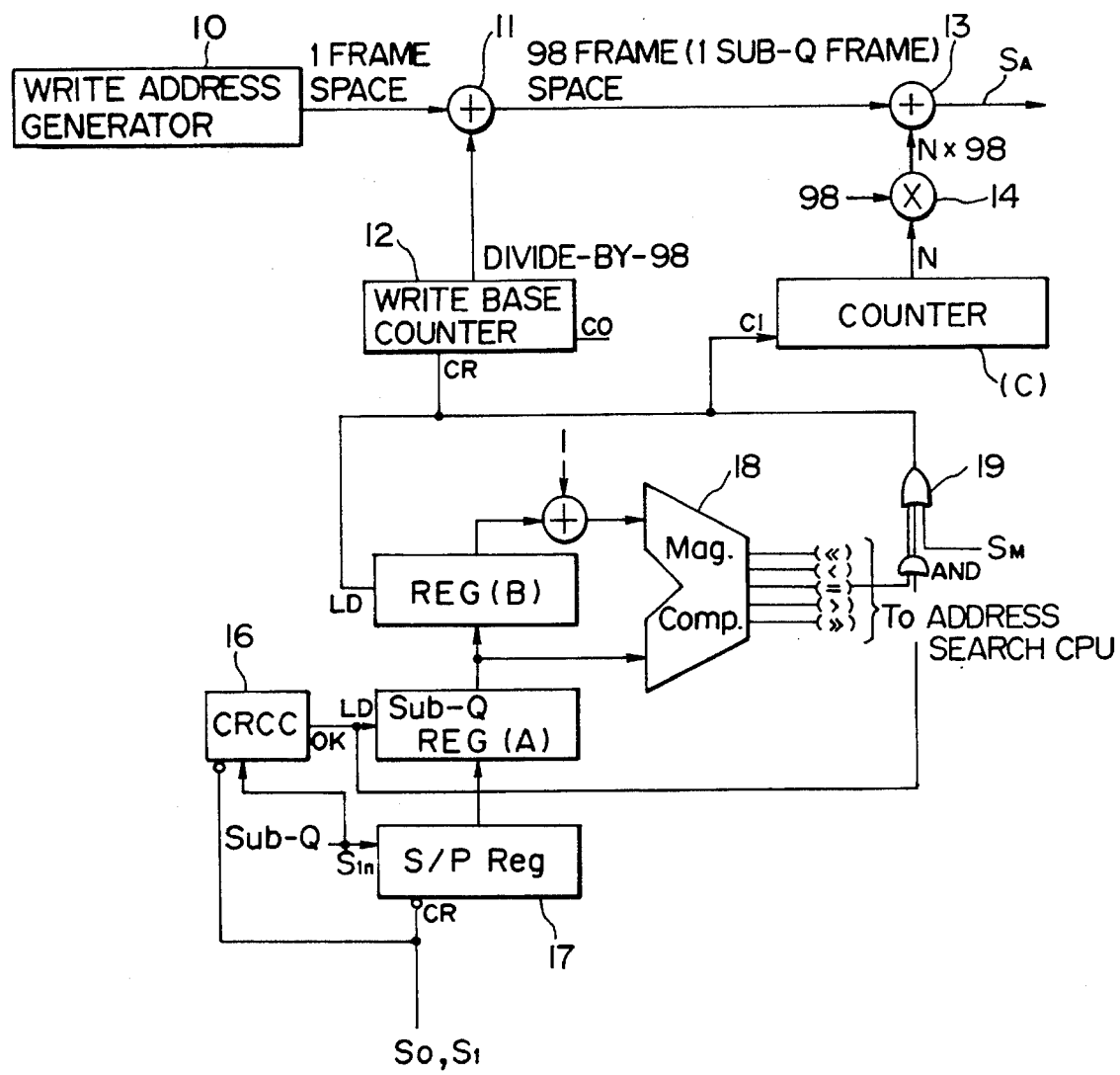
FIG. 2 is a block diagram of main portion explanatory of the operation of the CD player according to the embodiment of the invention shown in FIG. 1.

FIG. 2 is a block diagram explanatory of the operation of the main portion of the present invention. In FIG. 2, the write address of the RF signal is generated by an address generator 10 in units of one frame. The address signal generated by the address generator 10 is supplied to an adder 11. To this address signal is added a signal in units of 98 frames supplied from a write base counter 12 in the adder 11. Thereby, one-frame space generated by the address generator 10 is expanded to 98-frame space and, thus, a spatial address whose unit is formed of 98-frame space is generated.

The output of the adder 11 is supplied to a second adder 13. To this second adder 13, a signal 98N, representing multiples of 98, is supplied every time the Sub-Q signal is detected. The signal 98N is generated by multiplying a signal N output from a third counter (C) by 98 in a multiplier 14. By having the signal supplied from the adder 11 and the signal supplied from the multiplier 14 added together in the second adder 13, a write address signal $S_A$ for the large-capacity memory 6 is generated.

The signal N output from the third counter (C) is generated in the following way. That is, the Sub-Q data detected from the disk 1 is supplied to a serial/parallel conversion register 17 and successively shifted thereby.

Meanwhile, the same Sub-Q data as that given to the serial/parallel conversion register 17 is supplied to a cyclic redundancy check code detector 16 and the Sub-Q data is subjected to a parity check therein. When the data is OK'd in the parity check, the data for 98 frames is sent to a first register (A). Thus, the first register (A) is supplied with the 98-frame data of which the Sub-Q data is detected to be correct. Incidentally, the contents of the serial/parallel conversion register 17 and the cyclic redundancy check code detector 16 are cleared by the sync pattern signal $S_0$, $S_1$.

The data of the first register (A) is supplied to a second register (B) and also supplied to a magnitude comparator 18. The magnitude comparator 18 is also supplied with a signal obtained by adding 1 to the output of the second register (B). When both of the signals are equal (as indicated by = in the diagram), a signal indicative of concurrence of both the signals is output through a gate circuit 19. Incidentally, the track jump detection means 7 shown in FIG. 1 is formed of the magnitude comparator 18 and a CPU, not shown.

Thus, the second register (B) is loaded and, at the same time, the write base counter 12 is incremented by 1, and also the value of the signal N output from the third counter (C) is incremented by 1. The above described operations are controlled for timing to be performed in the instant an OK'ing signal is output from the cyclic redundancy check code detector 16. In the event that no OK'ing signal is output for a long time, a signal $S_M$ is output from for example the CPU.

Figure 3:
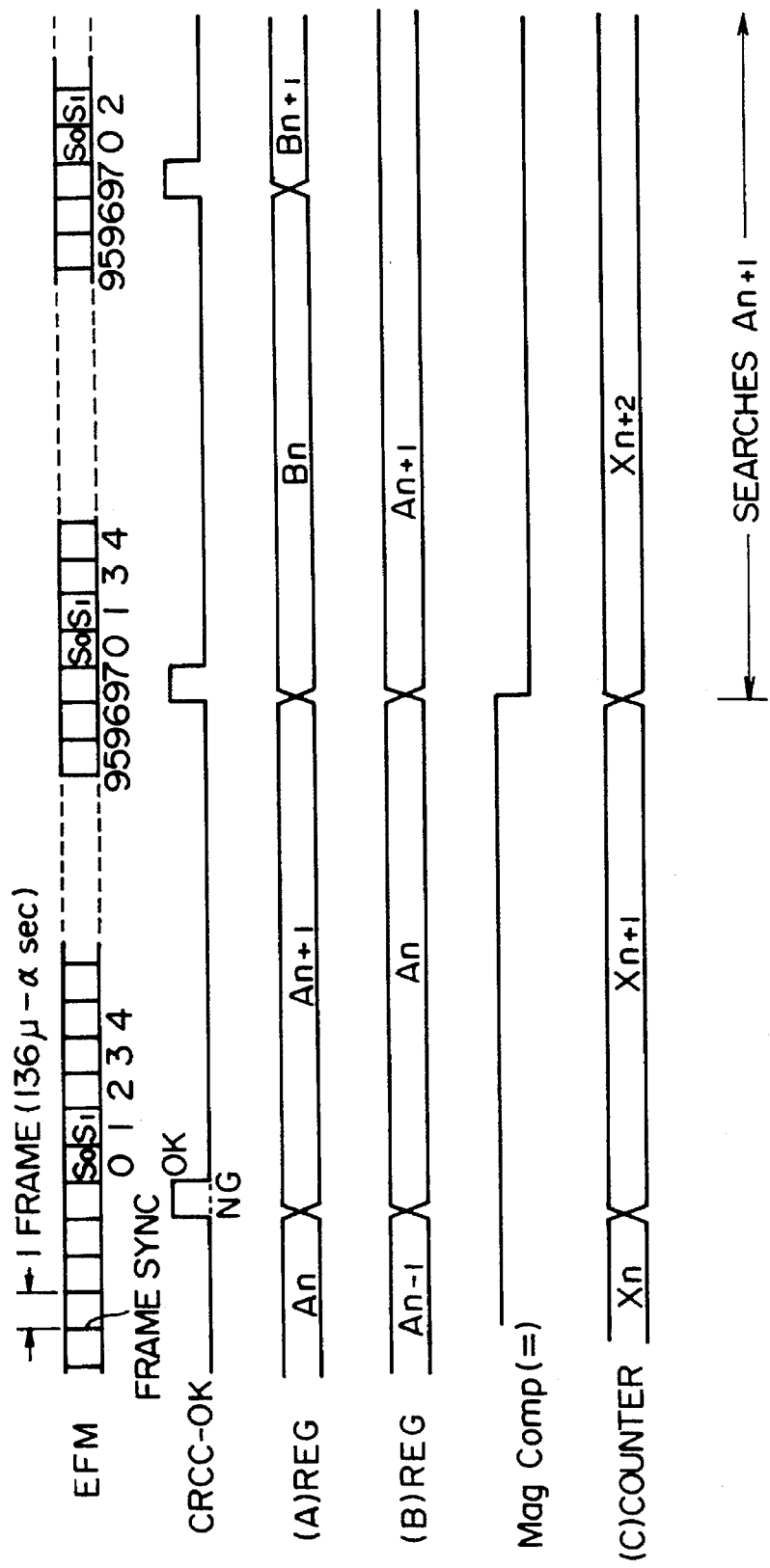
FIG. 3 is a waveform chart showing operations of each of the parts of the embodiment of the invention shown in FIG. 1 and FIG. 2.

FIG. 3 is a waveform chart showing the operations each of the parts. As apparent from FIG. 3, when a track jump occurs after $A_{n+1}$ in the first register (A) and then a signal $B_n$ is reproduced, the output of the first register (A) and the output of the second register (B) come into disagreement with each other and, hence, the delivery of the signal (at the level "H") indicating their being equal (=) from the magnitude comparator 18 is suspended.

Then, it becomes impossible to write a signal into the large-capacity memory 6 and thereby the wrong data is prevented from being written therein. At this time, the tracking servo circuit 5 starts its operation in response to a signal then output from the track jump detection means 7 to search for the position preceding where the track jump occurred, i.e., the position of $A_{n+1}$.

At this time, since signals <<, <, >, and >> indicating the relative magnitude of the output of the first register (A) and the output of the second register (B) are output from the magnitude comparator 18, the tracking servo circuit 5 is controlled dependent on such signals and, thereby, the position preceding where the track jump occurred is searched for. When the position preceding the track jump is located, reproduction is resumed from the next track position and thereby the continuity of the reproduced RF signal is maintained.

At this time, reproduction of the RF signal is suspended until the position preceding where the track jump occurred is located, However, since the CD player of the present embodiment is adapted to have sufficient data stored in the large-capacity memory 6, the large-capacity memory 6 is not emptied of the data stored therein while the reproduction is suspended. Therefore, the trouble of dropout of the output sound can be positively prevented.

In the present invention as described above, it is adapted such that the compact disk is rotated at a speed higher than its normal rotating speed to reproduce a greater amount of the data signal than necessary and the reproduced signal is stored into a large-capacity memory before the signal is deinterleaved, and, further, the data stored in the large-capacity memory is read out, when a track jump occurs, even while the tracking position of the pickup is being returned to the position preceding where the track jump occurred. Therefore, it can be achieved to maintain the continuity of the signal reproduced from the disk. Accordingly, even if a track jump is produced by an external shock given to the CD player, the signal output from the CD player is satisfactorily prevented from being dropped out and, thus, a much improved shockproof property over that in the conventional types can be realized in the present invention. Consequently, even in portable and on-vehicle CD players which are subject to strong vibration when they are in use, occurrence of a dropout can be satisfactorily prevented.

What is claimed is:

1. An apparatus for reproducing a signal including frames of data recorded in tracks on a disc, each frame of data having sub-Q data, comprising:

pickup means for reproducing the recorded signal to generate a reproduced signal, comparison means for detecting whether an incremented value of sub-Q data in a first frame of the reproduced signal is equal to a value of sub-Q data in a second frame of the reproduced signal to generate a control signal indicating that a track jump has occurred, means for adding a predetermined value to the sub-Q data in the first frame to generate the incremented sub-Q value, servo means for controlling the pickup means to search for the first frame on the disc as a function of said control signal, memory means for storing the reproduced signal, and means for writing the reproduced signal into the memory means as a function of said control signal, said means for writing exhibiting only two operative conditions, a first condition to write the reproduced signal into the memory means at only one predetermined rate and a second condition to cease writing.

2. An apparatus for reproducing a signal including frames of data recorded in tracks on a disc, comprising:

pickup means for reproducing the recorded signal to generate a reproduced signal, comparison means for comparing a value of first data in a first frame of the reproduced signal with a value of second data in a second frame of the reproduced signal to generate a control signal indicating that a track jump has occurred, servo means for controlling the pickup means to search for the first frame on the disc as a function of said control signal, memory means for storing the reproduced signal, and means for writing the reproduced signal into the memory means as a function of said control signal, said means for writing exhibiting only two operative conditions, a first condition to write the reproduced signal into the memory means at only one predetermined rate and a second condition to cease writing; and means for operating said servo means to control said pickup means to perform a reverse jump of one track when said memory means is full.

3. The apparatus of claim 2, wherein each frame of data has sub-Q data, and the comparison means compares the sub-Q data of the first and second frames.

4. The apparatus of claim 3, wherein the means for writing is operative in response to the sub-Q data in the reproduced signal.

5. The apparatus of claim 2, wherein data is read from the memory when the means for writing has ceased writing.

6. The apparatus of claim 2, wherein the data are interleaved in the recorded signal, and the comparison means compares the values in the first and second frames, as interleaved.

* * * * *